United States Patent
Vallejos Campos et al.

(10) Patent No.: US 11,528,085 B2
(45) Date of Patent: Dec. 13, 2022

(54) FAULT TOLERANCE METHOD FOR ANY SET OF SIMULTANEOUS LINK FAULTS IN DYNAMIC WDM OPTICAL NETWORKS WITH WAVELENGTH CONTINUITY CONSTRAINT

(71) Applicant: UNIVERSIDAD TÉCNICA FEDERICO SANTA MARÍA, Valparaíso (CL)

(72) Inventors: Reinaldo Antonio Vallejos Campos, Valparaíso (CL); Nicolás Alonso Jara Carvallo, Valparaíso (CL)

(73) Assignee: UNIVERSIDAD TÉCNICA FEDERICO SANTA MARÍA, Valparaíso (CL)

( * ) Notice: Subject to any disclaimer, the term of this patent is extended or adjusted under 35 U.S.C. 154(b) by 0 days.

(21) Appl. No.: 17/419,210

(22) PCT Filed: Nov. 26, 2019

(86) PCT No.: PCT/CL2019/050121
§ 371 (c)(1),
(2) Date: Jun. 28, 2021

(87) PCT Pub. No.: WO2020/132765
PCT Pub. Date: Jul. 2, 2020

(65) Prior Publication Data
US 2022/0069935 A1    Mar. 3, 2022

(30) Foreign Application Priority Data
Dec. 28, 2018  (CL) .................................. 3852-2018

(51) Int. Cl.
*H04J 14/02* (2006.01)
*H04L 45/28* (2022.01)
*H04L 45/302* (2022.01)

(52) U.S. Cl.
CPC ...... *H04J 14/0268* (2013.01); *H04J 14/0269* (2013.01); *H04J 14/0271* (2013.01); *H04L 45/28* (2013.01); *H04L 45/304* (2013.01)

(58) Field of Classification Search
None
See application file for complete search history.

(56) References Cited

U.S. PATENT DOCUMENTS

| 8,503,309 B2 * | 8/2013 | Vasseur | H04W 40/24 370/237 |
| 8,948,178 B2 * | 2/2015 | Mark | G06Q 30/02 370/392 |

(Continued)

OTHER PUBLICATIONS

Jara, N.et al., Blocking Evaluation and Wavelength Dimensioning of Dynamic WDM Networks Without Wavelength Conversion, Journal of Optical Communications and Networking, 9(8), 2017, pp. 625-634.

(Continued)

*Primary Examiner* — Jai M Lee
(74) *Attorney, Agent, or Firm* — Procopio, Cory, Hargreaves & Savitch LLP

(57) ABSTRACT

The present invention proposes a new method for solving the problem of fault tolerance. This new approach obtains all secondary routes assigned to each possible connection (user). The secondary routes replace the main routes when these are affected by at least one fault, which keeps the users connected as long as, for each connection, there is at least one route with operative links for reaching the destination nodes thereof. This new approach solves the general case of an arbitrary set of simultaneous link failures. The method also assesses the number of wavelengths $W_\ell$ for each link $\ell$ of the network, so that the probability of any connection request from a determined user c being blocked is less than (Continued)

a predefined threshold $\beta_c$, despite the possible occurrence of the fault scenario.

3 Claims, 6 Drawing Sheets

(56) References Cited

U.S. PATENT DOCUMENTS

| | | | |
|---|---|---|---|
| 9,054,831 B2* | 6/2015 | Prakash | H04J 14/0269 |
| 9,246,627 B2 | 1/2016 | Patel et al. | |
| 9,602,387 B2* | 3/2017 | Wood | H04L 41/122 |
| 9,712,447 B2 | 7/2017 | Wood et al. | |
| 10,187,144 B2* | 1/2019 | Prakash | H04B 10/0793 |
| 10,284,661 B2* | 5/2019 | Skalecki | H04L 67/51 |
| 2001/0034853 A1* | 10/2001 | Takatama | H04Q 3/66 |
| | | | 714/38.14 |
| 2004/0107382 A1* | 6/2004 | Doverspike | H04L 45/00 |
| | | | 714/4.1 |
| 2005/0237950 A1* | 10/2005 | Yuan | H04J 14/0227 |
| | | | 370/255 |
| 2008/0304480 A1* | 12/2008 | Langguth | H04L 45/36 |
| | | | 370/389 |
| 2010/0306574 A1* | 12/2010 | Suzuki | H04L 45/28 |
| | | | 714/E11.011 |
| 2014/0078895 A1* | 3/2014 | Iovanna | H04L 45/22 |
| | | | 370/228 |

OTHER PUBLICATIONS

Ramamurthy, S., et al., Survivable WDM Mesh Networks, Journal of Lightwave Technology, 21(4), Apr. 2003, pp. 870-883.

Schupke, D.A., et al., Optimal Configuration of p-Cycles in WDM Networks, 2002 IEEE International Conference on Communications, Apr. 28-May 2, 2002, New York, 5 pgs.

Schupke, D.A., Multiple Failure Survivability in WDM Networks with p-Cycles, Proceedings of the 2003 International Symposium on Circuits and Systems ISCAS '03, May 25-28, 2003, Bangkok, Thailand, 4 pgs.

Schupke, D.A., et al., Capacity Efficiency and Restorability of Path Protection and Rerouting in WDM Networks Subject to Dual Failures, Photonic Network Communications, Sep. 2004, 28 pgs.

To, M., et al., Unavailability Analysis of Long-Haul Networks, IEEE Journal on Selected Areas in Communications 12 (1), Jan. 1994, pp. 100-109.

Office Action for related CL App No. 2018-003852 dated Jun. 9, 2021, 7 pgs.

International Search Report and Written Opinion for related PCT App No. PCT/CL2019/050121 dated Mar. 24, 2020, 9 pg. (partial translation).

* cited by examiner

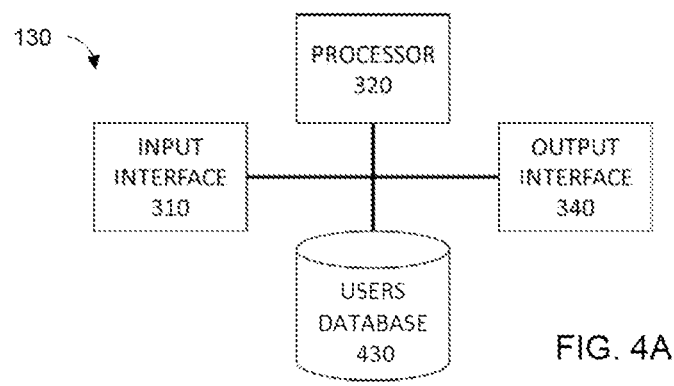
FIG. 4A
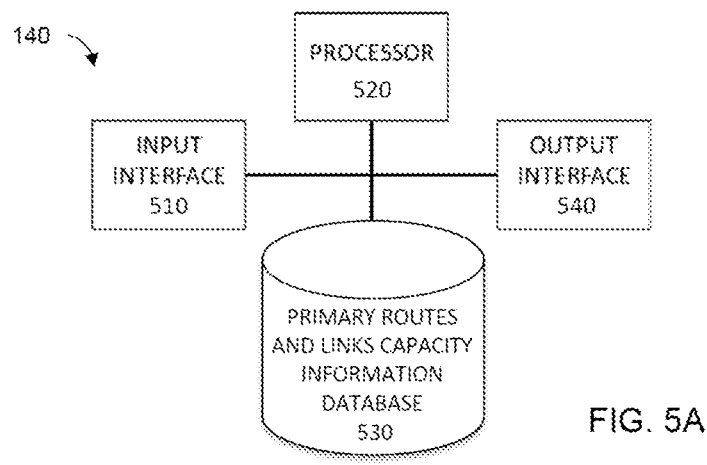
FIG. 4B
FIG. 5A

530 ↘

| LINKS CAPACITY TABLE 550 ||
| --- | --- |
| Link | Capacity |
| Link A,B | Capacity Link A,B |
| Link J,I | Capacity Link J,I |
| ... | ... |

530 ↘

| PRIMARY ROUTES TABLE 560 |||||||||
| --- | --- | --- | --- | --- | --- | --- | --- | --- |
| Source Node | Destination Node | Node 0 | Node 1 | Node 2 | Node 3 | Node 4 | ... | Node N |
| Node F | Node H | Node F | Node G | Node H | | | | |
| ... | ... | ... | ... | ... | ... | ... | ... | ... |
| Node A | Node F | Node A | Node B | Node F | | | | |
| ... | ... | ... | ... | ... | ... | ... | ... | ... |

810

TEMPORARY LINKS CAPACITY TABLE 830

| Failure ID | Link | Capacity |
|---|---|---|
| F1 | Link A,B | Capacity A,B |
| F1 | Link J,I | Capacity J,I |
| ... | ... | ... |
| F2 | Link A,B | Capacity A,B |
| ... | ... | ... |

LINKS CAPACITY TABLE 840

| Link | Capacity |
|---|---|
| Link A,B | Capacity A,B |
| Link J,I | Capacity J,I |
| ... | ... |

SECONDARY ROUTES TABLE 850

| Failure ID | Source Node | Destination Node | Node 0 | Node 1 | Node 2 | Node 3 | Node 4 | ... | Node N |
|---|---|---|---|---|---|---|---|---|---|
| F1 | Node F | Node H | Node F | Node I | Node J | Node H | | | |
| ... | ... | ... | ... | ... | ... | ... | | | |
| F2 | Node A | Node F | Node A | Node C | Node H | Node G | Node F | | |
| | ... | ... | ... | ... | ... | ... | ... | ... | |

FAULT TOLERANCE METHOD FOR ANY SET OF SIMULTANEOUS LINK FAULTS IN DYNAMIC WDM OPTICAL NETWORKS WITH WAVELENGTH CONTINUITY CONSTRAINT

CROSS-REFERENCE TO RELATED APPLICATIONS

This application is a U.S. National Stage entry of PCT Application No: PCT/CL2019/050121 filed Nov. 26, 2019, which claims priority to Chilean Application No: 3852-2018 filed Dec. 28, 2018, the contents of which are incorporated herein by reference.

FIELD OF APPLICATION

The present invention relates to the field of routing in optical networks, more particularly to routing in optical networks with wavelength continuity constraint, and in particular presents a method for determining a set of secondary routes that allow users to be connected in the event of any failure from any set of links in the network.

STATE OF THE ART

An important problem to be solved in the design of WDM optical networks is to ensure that the network can still provide its transmission service after failure of one or more of its links. The solution to this problem consists in providing the necessary infrastructure to rapidly restore communications between all source-destination pair of nodes affected by these link failures. This type of mechanism is known as fault tolerance.

The frequency of link failure occurrence is often significant. For example, "*Unavailability Analysis of Long-Haul Networks*", by M. To and P. Neusy, IEEE JSAC, vol. 12, January 1994, pp. 100-109, reports measures of the mean time between failures of approximately 367 year/km. This explains why links failure can significantly affect the performance of the networks. For example, in a 26,000 km-long network as NSFNet, there is an average of one fiber cut every five days. Moreover, it has been found that the frequency at which two simultaneous network failures occur is high enough to be considered in the design process. For example, in "*Capacity Efficiency and Restorability of Path Protection and Rerouting in WDM Networks Subject to Dual Failures*", by D A Schupke, R G. Prinz, Photonic Network Communications, pp. 191-207, 2004, it has been reported that the probability of two simultaneous failures occurring in a network such as NSFNet is approximately 0.0027 (downtime of approximately 24 hours per year on average), which in addition to the high transmission rate of this type of networks, involves an unacceptable loss to the operator if the event happens.

The above elements justify the need to provide an efficient methodology for multiple failure tolerance, which should ensure (with a certain probabilistic guarantee) successful communications between all users of the network, despite the occurrence of failures in some of the links and at the lowest possible cost in terms of network infrastructure.

The fault tolerance mechanisms are significantly affected by the presence (or not) of the wavelength conversion capabilities at the optical nodes. This means that if a node receives an incoming signal at a given wavelength, then the node may (or may not) transmit the signal on any output channel but using a different wavelength. However, wavelength conversion technology is not completely available. Therefore, actual optical networks have a wavelength continuity constraint, that is, when an end-to-end communication is performed between any pair of nodes, the route connecting them must use the same wavelength in each route link. This invention is centered in the case of non-conversion.

The fault tolerance methods proposed so far generally have been dedicated to finding alternative paths considering single link failure. This means that a bidirectional link fails, affecting connections to the routes passing through the failed link in both directions (uplink and downlink). Then, the number of wavelengths in the network is dimensioned to tolerate this situation. However, as mentioned before, the probability of occurrence of two or more simultaneous failures is often high enough, which is why it is useful to consider this event in the design of the network. In addition, some studies have considered other special instances of failures, such as disaster risk constraints and shared risk groups scenarios. Disaster risk constraints considers the possible service disruptions in case of a natural disaster or a targeted attack. On the other hand, Shared Risk Group (SRG) considers the possibility that some fibers are placed physically together, even if they are connecting different optical nodes. This scenario makes them all liable to physical cuts since they can be cut together at the same time.

Following the concepts and methods discussed above, the major existing patents and research on fault tolerance in dynamic WDM optical networks with wavelength continuity constraints are described below. One of the most common forms that are considered to address the single and double fault-tolerance, called "1+1", can be found in "*Survivable WDM mesh networks*", by Ramamurthy et. al., published in Lightwave Technology, Journal of, 21 (4): 870-883, 2003. In this technique, a secondary route is associated with each of the primary routes, with the constraint that they do not share any links, and the information is transmitted simultaneously through both routes. In order to dimension the number of wavelengths of each link (a task that is generally performed by simulation), each secondary route is considered simply as another network route with a load equal to the corresponding primary route. The method 1+1 is also scalable to provide tolerance to $K \leq 1$ simultaneous failures. In this case, for each connection, K+1 complementary disjoint routes must be found, one to be designed as the primary route and the remaining K as secondary routes. It should be noted that a necessary and sufficient condition (that allows this scheme to work) is that the graph defined by the set of nodes and links is connected (K+1).

Another strategy is described in "*Capacity Efficiency and Restorability of Path Protection and Rerouting in WDM Networks Subject to Dual Failures*" by Schupke and Prinz, Photonic Network Communications, 8 (2): 191-207, 2004, where a routing technique is proposed to provide fault tolerance by sharing the resources of the network. This method is known as "shared path protection" (SPP). In this method, additional resources (wavelengths) assigned to the secondary routes may be shared by different connections, and are assigned only when a fault occurs. This method can be executed in two different ways. The first consists of executing the algorithm off-line, where the routes are calculated prior to the operation of the network (SPP offline). The second way is the on-line implementation (SPP online). In the latter case, the method is executed every time there is a network link failure. In the SPP online mode, the primary routes are specified before the network is in operation, but in order to find new routes to the affected connections, it must be executed again every time that one or more simultaneous failures occur. Therefore, it is decided that this is a proactive and reactive approach at the same time.

In "*Optimal Configuration of p-Cycles in WDM Networks*", by D. Schupke et. al., in IEEE International Conference on Communications, pages 2761-2765, 2002, a fault tolerance method called "P-cycle" is used, which allows sharing resources through fixed secondary routes having a cyclic form. These routes are shared between several primary routes. One problem with this approach is that the applicability of the idea is very dependent on the size of the network, which introduces excessive additional delay for a connection in protection state on large networks. In addition, in order to perform a multiple fault tolerance, this method requires a large number of cycles (e.g., hundreds of cycles for the 11 nodes pan-European COST 239 network, as shown in "*Multiple failure survivability in WDM networks with p-cycles*", by D. Schupke, in Circuits and Systems, 2003. ISCAS Proceedings of the 2003 International Symposium, volume 3, pages III—866—III—869 vol. 3, May 2003), which is impractical from various points of view.

U.S. Pat. No. 9,246,627 B2 by Ankitkumar et. al., discloses joint optimization method for resolving the routing and wavelength assignment with fault tolerance in dynamic optical networks with wavelength continuity constraints. In this approach, the secondary routes may be dedicated or shared. The dedicated alternative routes are obtained based on the 1+1 approach; meanwhile, the shared path protection method is used to obtain the shared secondary routes. This method allows to address multiple link or node failures. The main idea is to provide fault tolerance to those users that require greater quality of service with dedicated protection, while other users can share the resources to obtain fault tolerance. This method does not quantify the necessary number of wavelengths in each network link, so it cannot guarantee any quality-of-service requirement.

SUMMARY OF THE INVENTION

This invention discloses a novel method for determining the set of additional routes, called secondary routes, which are used to keep each user connected in cases where any set of simultaneous link failures occurs. In addition, the number of wavelengths available at each network link is calculated so that the blocking probability of each connection is lower than a predetermined threshold (which is a design parameter of the network), despite the occurrence of any set of simultaneous link failure. More specifically, it discloses a fault tolerance method for any set of network link failure scenarios, wherein a failure scenario is comprised of a set of simultaneous link failures in dynamic wavelength division multiplex (WDM) optical networks having wavelength continuity constraints.

The present invention discloses a computer implemented method for providing fault tolerance to a dynamic wavelength division multiplex (WDM) optical network having wavelength continuity constraints, characterized in that it comprises the steps of:
  obtaining, by means of a computational device, a topology of said network, wherein said network is represented by a graph $\mathcal{G} = (\mathcal{N}, \mathcal{L})$ comprised of a set, $\mathcal{N}$, of nodes interconnected by a set, $\mathcal{L}$, of links;
  obtaining, by means of said computational device, a set of users of said network, wherein a user is defined as a pair of nodes, source and destination, and a traffic load associated with said user;
  obtaining, by means of said computational device, a set of primary routes, each primary route corresponding to a user, and a set of capacities, each capacity corresponding to a link of said set of links;
  obtaining, by means of said computational device, a failure scenario, said failure scenario corresponding to a subset of links or nodes in failed state;
  generating, by means of said computational device, a second topology corresponding to the topology of said network, removing the links in failed state corresponding to said failure scenario;
  calculating, by means of said computational device and for each user of said network whose primary route uses any of said links in failed state, corresponding to said failure scenario, a new cheaper route; and
  storing, by means of said computational device, said cheaper routes as secondary routes, corresponding to said set of users in said failure scenario, in a database.

In a preferred embodiment, the method is characterized in that said computational device obtains a set of failure scenarios, and in that it comprises the steps of:
  generating, by means of said computational device, a second topology corresponding to the topology of said network in which the links in failed state, corresponding to said failure scenario, are removed;
  calculating, by means of said computational device and for each user of said network whose primary route uses any of said links in failed state, corresponding to said failure scenario, a new cheaper route; and
  storing, by means of said computational device, said cheaper routes as secondary routes, corresponding to said set of users in said failure scenario, in a database,
  they are executed for each failure scenario belonging to said set of failure scenarios.

In another preferred embodiment, the method is characterized in that said step of calculating, by means of said computational device and for each user of said network whose primary route uses any of said links in failed state corresponding to said failure scenario, a new cheaper route, comprising the steps of:
  selecting, by means of said computational device, one of said users whose primary route uses any of the links in failed state;
  calculating, by means of said computational device, a cost for each link in said new topology, said cost being defined as the sum of the traffic loads of the primary routes using said link and the traffic loads of the secondary routes using said link;
  obtaining, by means of said computational device, a new cheaper route for said selected user, using said new topology and the costs of each link; and
  repeating the above steps until a cheaper route has been obtained for all users whose primary route uses any of the links in failed state.

In a further preferred embodiment, the method is characterized in that it further comprises the step of calculating, by said computational device, a links capacity in said new topology, said links capacity corresponding to the number of minimum wavelengths in each link that allows, for each user, that its blocking probability be lower than a threshold blocking probability. In a more preferred embodiment, the method is characterized in that said links capacity is obtained by the execution of the method described in the article "*Blocking Evaluation and Wavelength Dimensioning of Dynamic WDM Networks without Wavelength Conversion*" published by Jara et. al., in Journal of Optical Communications and Networking, vol. 9, no. 8, pp. 625-634, 2017. In yet another preferred embodiment, the method is characterized by comprising the step of obtaining, by means of said computational device, a capacity for each link of the original network topology, wherein in order to obtain the capacity corresponding to a link of the original network, said computational device searches the maximum capacity of said link between the different failure scenarios and in the original scenario.

BRIEF DESCRIPTION OF THE DRAWINGS

FIG. 4A is a diagram depicting the structure of the user information system of FIG. 1.

FIG. 4B is a diagram depicting a table for storing network users information pertaining to the users database of FIG. 4A.

FIG. 5A is a diagram depicting the primary routes and links capacity information system of FIG. 1.

FIG. 7B is a diagram depicting the temporary links capacity table calculated during execution of the invention and stored in the secondary routes and links capacity database of FIG. 7A.

FIG. 7C is a diagram depicting the links capacity table calculated and stored in the secondary routes and links capacity database of FIG. 7A.

FIG. 7D is a diagram depicting the secondary routes tables calculated and stored in the secondary routes and links capacity database of FIG. 7A.

DETAILED DESCRIPTION OF THE INVENTION

Figure 1:
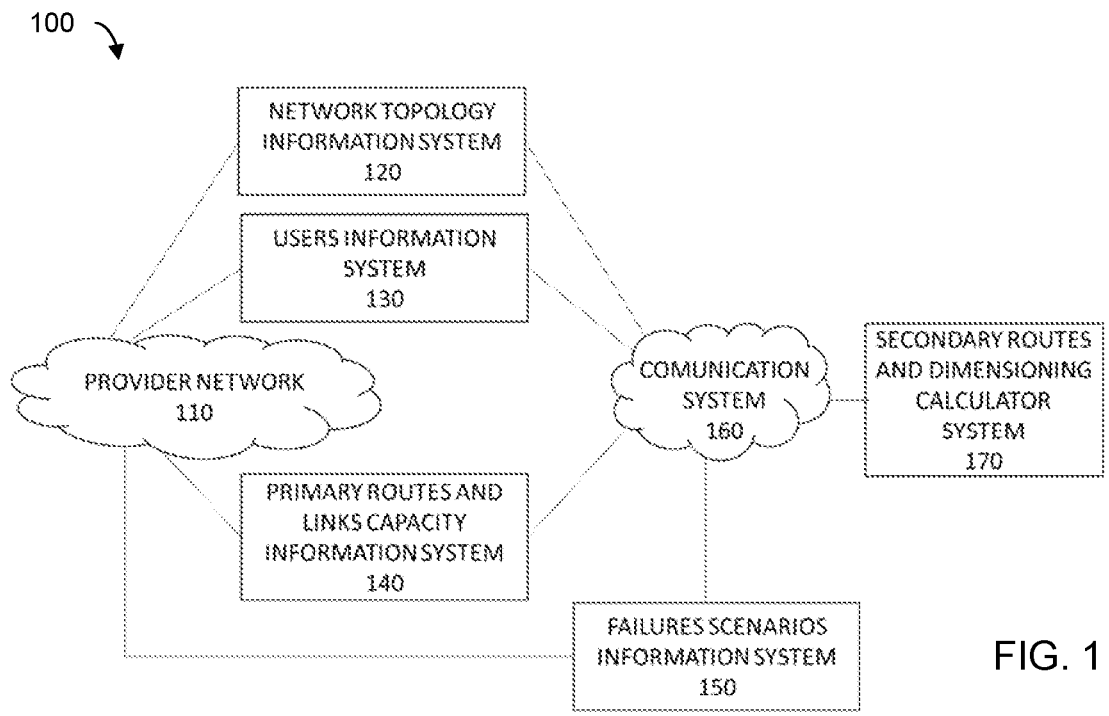
FIG. 1 is a diagram depicting, in a general manner, the type of environment in which the invention is implemented, identifying the main subsystems involved in its operation.
Figure 2:
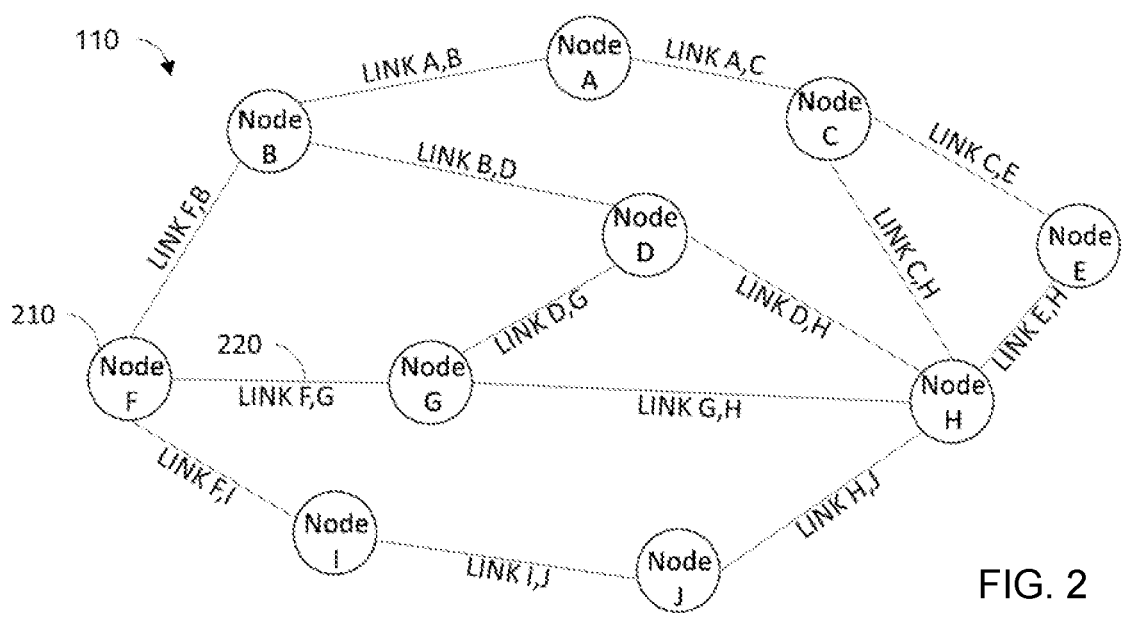
FIG. 2 is a diagram depicting the topology of the provider network of FIG. 1.

The operation of the secondary route method can be performed in the environment 100 as presented in FIG. 1. The configuration may be comprised of a provider network 110, the structure of which is stored in a topology information system 120. It may also contain a users information system 130, which contains: the set of users (source-destination pair of nodes) using the provider network 110, the traffic load of each user, and the maximum blocking probability (QoS) accepted for each user. In addition, it comprises the secondary routes and dimensioning calculator system 170, in charge of calculating the secondary routes and the links capacity to support a given set of link failure scenarios stored in the failure scenarios information system 150. To make this calculation, the secondary routes and dimensioning calculator system 170 also uses the primary route and initial link capacity information of the provider network 110, stored in the primary routes and links capacity information system 140. The secondary routes and dimensioning calculator system 170 may send or receive information from other systems using the communication system 160.

The network of the provider 110 is an optical network, modeled as a graph by a graph $\mathcal{G} = (\mathcal{N}, \mathcal{L})$ composed of a set, $\mathcal{N}$, of nodes 210 interconnected by a set, $\mathcal{L}$, of fiber or multi fiber optic links 220. A network node 210 may be any type of optical network without wavelength conversion capability (that is, an optical cross-connect OXC).

Figures 3A, 3B, 3C:
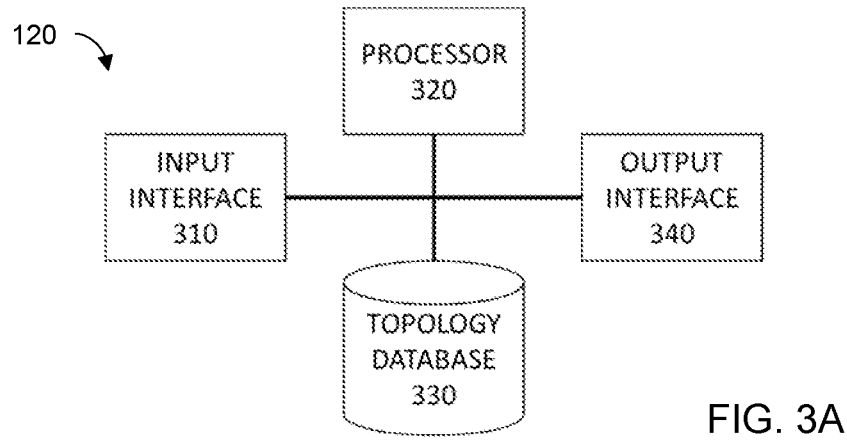
FIG. 3A is a diagram depicting the structure of the network topology information system of FIG. 1.
FIG. 3B is a diagram depicting a table for storing the node information of FIG. 2.
FIG. 3C is a diagram depicting a table for storing the link information of FIG. 2.

The network topology information system 120 may be a server or network device inside or outside the provider network 110. The network topology information system 120 may be comprised of an input interface 310 that receives a request or data from the communication system 160, which is processed by a processor 320, and stored in a topology database 330. Topology database 330 includes nodes information 210 and links information 220 from the provider network 110 using a table for storing nodes 350 and links 360, as shown in FIGS. 3B and 3C, respectively. To communicate with other systems or devices, the network topology information system 120 may send messages using the output interface 340.

The user information system 130 may be a server or network device outside the provider network 110 and may be comprised of an input interface 410 that receives requests or information from the communication system 160. This information is processed by the processor 420 and may be stored in the users database 430. The users database 430 contains all users data (pairs of nodes) of the provider network 110, and the traffic load associated with each of them, which are stored in the users table 450, as shown in FIG. 4B. To interact with other systems and devices, the users information system 130 may send messages using its output interface 440.

Figures 5B, 5C, 6A:
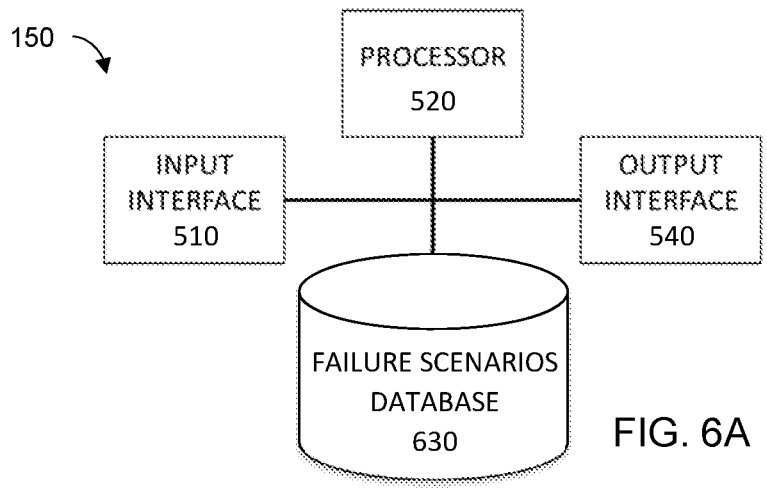
FIG. 5B is a diagram depicting the links capacity tables stored in the primary routes and links capacity database of FIG. 5A.
FIG. 5C is a diagram depicting the primary routes tables stored in the primary routes and links capacity database of FIG. 5A.
FIG. 6A is a diagram depicting the structure of the failure scenarios information system of FIG. 1.

The primary routes and links capacity information system 140 may be a server or network device outside the provider network 110 and may be comprised of an input interface 510 that receives requests or information from the communication system 160. This information is processed by the processor 520 and may be stored in the primary routes and links capacity information database 530. The primary routes and links capacity information database 530 contains all of the primary routes of the users (pairs of nodes), stored in a primary routes table 560 as shown in FIG. 5C, and the links capacity in the provider network 110, stored in the links capacity table 550, as shown in FIG. 5B. To interact with other systems and devices, the primary routes and links capacity system 140 may send messages using the output interface 540.

Figures 6B, 7A:
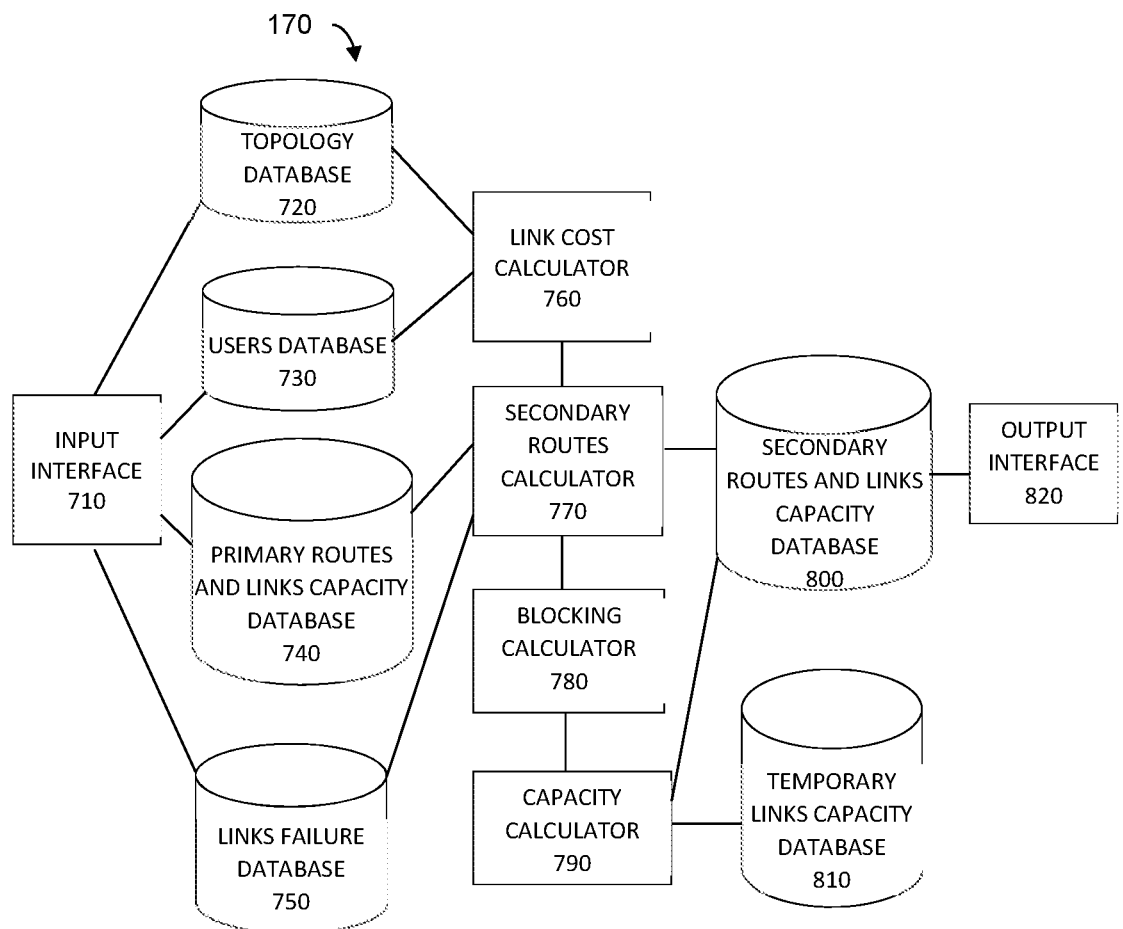
FIG. 6B is a diagram depicting the failure scenarios table stored in the failure scenarios database of FIG. 6A.
FIG. 7A is a diagram depicting the structure and functional components of the secondary routes and dimensioning calculator system of FIG. 1.

The failure scenarios information system 150 may be a server or a network device outside the provider network 110 and may be comprised of an input interface 610 that receives requests or information from the communication system 160. This information is processed by the processor 620 and may be stored in the failure scenarios database 630. The failure scenarios database contains a set of failure scenarios stored in a failure scenarios table 650, as shown in FIG. 6B. To interact with other systems and devices, the failure scenarios information system 130 may send messages using the output interface 640.

The secondary routes and dimensioning calculator system 170 may be a server or a computing device capable of communicating with other devices, for example, a desktop computer or laptop computer, outside the provider network 110. The secondary routes and dimensioning calculator system 170 may be comprised of an input interface 710, that accepts requests or information from the communication system 160. During execution of the secondary routes method, the secondary routes and dimensioning calculator system 170 may request: network topology data from the network topology information system 120; users data from the users information system 130; primary routes and links capacity from the primary routes and links capacity information system and 140; and links failure scenarios information from the failure scenarios information system 150. Said data is stored in the device's own databases, either in: the topology database 720 with the topology data; the users database 730 with the users data; the primary routes and links capacity database 740 with the primary routes and links capacity data; and the failure scenarios database 750 with the faults scenarios data. For each failure scenario stored in the failure scenarios database 750, the link cost calculator module 760 removes the links included in the failure situation and recalculates the cost of the remaining links using data from: the topology database 720, the users database 730, and the primary routes and links capacity database 740, to calculate each cost associated with the link.

The secondary routes calculator 770 identifies all affected users at each failure scenario and calculates a secondary route for each affected user using a cheapest route algorithm (that is, Dijkstra). All of the calculated secondary routes are stored in the secondary routes and links capacity database 800, as a secondary routes table 850, as shown in FIG. 7D. For each failure scenario stored in the failure scenario database 750, the blocking calculator 780 uses the secondary routes of the users affected by the failure situation (from the secondary routes and links capacity database 800), and the primary routes of unaffected users (from the primary routes and links capacity database 740), to calculate the blocking probability of each user. Then, the capacity calculator 790 calculates the capacity of all of the links associated with each failure scenario, ensuring that the blocking probability of each user, calculated by the blocking calculator 780, does not exceed the maximum blocking probability for each user that is obtained from the users database 730. The calculated links capacities, associated with the failure scenario, are stored in the temporary links capacity database 810 in a temporary links capacity table 830, as shown in FIG. 7B. The calculated secondary routes and links capacity associated with each failure scenario stored in the secondary routes and links capacity database 800, may be delivered to any other system or device using the output interface 590.

The communication system 160 may be any network system that allows to connect two or more devices, such as the cellular network, the public land mobile network (PLMN), a second generation (2G) network, a third generation (3G) network, a fourth generation (4G), a long term evolution (LTE) network, a fifth generation (5G), a code division multiple access (CDMA) network, a global system for mobile communications (GSM) network, a general packet radio service (GPRS), a local area network (LAN), a wide area network (WAN), a metropolitan area network (MAN), an ad hoc network, an intranet, the Internet, a fiber optic based network, a satellite network, television network, or a mixture of one or more of these systems.

The fault tolerance method is performed on the secondary route 100, and its operation is described below:

1. The network topology information system 120 obtains the network topology information from the provider 110 and stores it in the topology database 720.
2. The users information system 130 obtains the users information (traffic load and minimum quality of service threshold) from the provider network 110 and stores it in the users database 430.
3. The primary routes and links capacity information system 140 obtains the routes and links capacity information from the provider network 110 and stores them in the primary routes and links capacity database 740.
4. The failure scenarios information system 150 obtains the information from the failure scenarios provided from the provider network 110 and stores them in the failure scenarios database 750.
5. The secondary routes calculator 770 obtains the failure scenarios (set of links in failed state in the network topology) from the failure scenarios database 750.
6. The secondary routes calculator 770 selects the first failure scenario from the failure scenarios database 750.
7. The links cost calculator 760 creates a new topology identical to the original, but removes all of the links that considered to be in failed state.
8. For each user affected in the chosen failure scenario:
   a. The secondary routes calculator 770 selects one of the users affected.
   b. The links cost calculator 760 calculates, for each link in the new topology, a new cost. The link cost is equal to the sum of the traffic loads of the primary routes (not affected in the failure scenario passing through said link) plus the traffic load of all of the secondary routes already calculated in the current fault scenario (that is, those stored in the secondary routes table 850) that use said link.
   c. The secondary routes calculator 770 calculates a new cheaper route for the affected user. To do this, the secondary routes calculator 770 uses the new topology obtained in step 7 and the cost calculated in step 8b.
   d. The secondary routes calculator 770 adds the secondary (alternative) route associated with the affected user and the failure scenario in the secondary routes table 850.
9. The capacity calculator 790 dimensions and stores, in the temporary links capacity table 830, the capacity of all links in the new topology. To dimension the link wavelengths, the method must guarantee a minimum quality of service for each user stored in the users database 430. To evaluate the dimensioning and blocking probability of each user, the method described in "*Blocking Evaluation and Wavelength Dimensioning of Dynamic WDM Networks without Wavelength Conversion*" by Jara et. al., in Journal of Optical Communications and Networking, vol. 9, no. 8, pp. 625-634, 2017, or any other method available in the literature may be used.
10. The secondary routes calculator 770 removes the failure scenario from the failure scenarios database 750.
11. Steps 6, 7, 8, 9, and 10 are repeated until there are no more failure scenarios in the failure scenarios database 750.
12. For each network link stored in the topology database 720, the maximum capacity calculated and stored in the temporary links capacity table 830 is selected, storing it in the links capacity table 840. To obtain said maximum, for each network link, the dimensions obtained in all of the failure scenarios and the event without failure are compared. The greater dimensioning of each link is stored in the links capacity table 840.

The invention claimed is:

1. A computer-implemented method for conferring fault tolerance to a dynamic wavelength division multiplexing (WDM) optical network having wavelength continuity constraints, characterized in that it comprises steps of:
   obtaining, by means of a computational device, an original topology of the network, wherein the network is represented by a graph $\mathcal{G} = (\mathcal{N}, \mathcal{L})$ comprised of a set, $\mathcal{N}$, of nodes interconnected by a set, $\mathcal{L}$, of links;
   obtaining, by means of said computational device, a set of users of the network and a traffic load associated with each user of the set of users, wherein each user is defined as a source node and a destination node;
   obtaining, by means of said computational device, a set of primary routes for the set of users and a set of capacities for the set of links, wherein each user of said set of users has a primary route that uses links interconnecting the source node and the destination node, and wherein each capacity of said set of capacities corresponds to a number of wavelengths available on its corresponding link of said set of links;
   obtaining, by means of said computational device, a set of failure scenarios wherein each failure scenario corresponds to at least one link in a failed state that could affect at least one user of the set of users;
   generating, by means of said computational device, a new topology for each failure scenario, wherein the links in failed state of said failure scenario are removed from the original topology of the network;
   calculating, by means of said computational device, for each user of the set of users whose primary route uses any of the links in failed state of said failure scenario, a secondary route in the new topology; and
   storing, by means of said computational device, said secondary routes of the set of users in a database;
   wherein said step of calculating said secondary route comprises the steps of:
   (i) obtaining, by means of said computational device, a cost for each link of the new topology, wherein said cost is equal to sum of the traffic load of each primary routes that does not use links in failed state;
   (ii) selecting, by means of said computational device, one of said users whose primary route uses any of the links in failed state;
   (iii) obtaining, by means of said computational device, the secondary route of the selected user, wherein the secondary route is defined as a cheapest route using the links of the new topology and the cost of said links;
   (iv) calculating, by means of said computational device, the cost of each link belonging to the secondary route obtained, wherein said cost is equal to its previous cost plus the traffic load of the said secondary route;
   (v) extracting, by means of said computational device, from the set of users whose primary route uses any of the links in failed, the said user whose secondary route was calculated in the previous step;
   (vi) repeating, by means of said computational device, the steps (ii) to (v) until the set of users whose primary route uses any of the links in failed state is removed.

2. The method according to claim 1, characterized in that it further comprises the step of calculating, by said computational device, the set of capacities for the set of links in said new topology, wherein each capacity corresponds to a number of minimum wavelengths available on its corresponding link that allows, for each user, that its blocking probability be lower than a threshold blocking probability.

3. The method according to claim 2, characterized in that it comprises the step of obtaining, by means of said computational device, a capacity for each link of the original topology of the network, wherein in order to obtain the capacity corresponding to a link of the original topology of the network, said computational device searches a maximum capacity of said link between different failure scenarios and in the original topology of the network.

* * * * *